US010552809B2

(12) United States Patent
Evans

(10) Patent No.: US 10,552,809 B2
(45) Date of Patent: Feb. 4, 2020

(54) PROGRAMMABLE CARD

(75) Inventor: Graham Evans, Holland Landing (CA)

(73) Assignee: Visa International Service Association, San Francisco, CA (US)

(*) Notice: Subject to any disclaimer, the term of this patent is extended or adjusted under 35 U.S.C. 154(b) by 684 days.

(21) Appl. No.: 13/185,198

(22) Filed: Jul. 18, 2011

(65) Prior Publication Data

US 2012/0023024 A1  Jan. 26, 2012

Related U.S. Application Data

(60) Provisional application No. 61/367,646, filed on Jul. 26, 2010.

(51) Int. Cl.
*G06Q 20/10* (2012.01)
*G06Q 20/34* (2012.01)
*G06Q 20/40* (2012.01)

(52) U.S. Cl.
CPC ......... *G06Q 20/105* (2013.01); *G06Q 20/341* (2013.01); *G06Q 20/352* (2013.01); *G06Q 20/3552* (2013.01); *G06Q 20/4018* (2013.01)

(58) Field of Classification Search
CPC .................................................. G06Q 20/105
(Continued)

(56) References Cited

U.S. PATENT DOCUMENTS 5,515,440 A * 5/1996 Mooney et al. ............... 713/159
5,526,428 A * 6/1996 Arnold .......................... 713/159
(Continued)

FOREIGN PATENT DOCUMENTS

| WO | 2005043438 A1 | 5/2005 |
|---|---|---|
| WO | WO 2005/119607 A2 | 12/2005 |
| WO | WO 2009/036141 A1 | 3/2009 |

OTHER PUBLICATIONS

Kaur, S.,et al. (Apr. 15, 2010). Design issues for replacing credit card on mobile phone Springer Verlag, Tiergartenstrasse 17, D-69121. ProQuest [retrieved on Sep. 2, 2019]. (Year: 2010).*

(Continued)

*Primary Examiner* — James M Detweiler
*Assistant Examiner* — Monica A Mandel
(74) *Attorney, Agent, or Firm* — Kilpatrick Townsend & Stockton LLP

(57) ABSTRACT

Embodiments of the invention are directed to programming a payment device that can be in the same form factor as a typical credit or debit card and which can be programmed and reprogrammed with various payment profiles. The payment device is interfaced with a mobile device, such as through insertion into a module capable of holding the payment device within proximity to a main housing of the mobile device. The payment device can include both a magnetic stripe and an IC chip which is capable of near field communication. In embodiments of the invention, the mobile device, such as a cellular phone, includes a memory element. The memory element securely stores payment profiles of financial accounts which are commonly found on credit, debit, gift, transit and loyalty cards. When a payment profile stored in the memory element of the mobile phone is selected, the mobile phone writes the profile onto the payment device. The payment device can then be utilized to communicate payment profile information to a payment device reader during contact or contactless transaction.

6 Claims, 8 Drawing Sheets

(58) Field of Classification Search
USPC .......................................................... 705/66
See application file for complete search history.

(56) References Cited

U.S. PATENT DOCUMENTS

| | | | | |
|---|---|---|---|---|
| 5,585,787 | A * | 12/1996 | Wallerstein | 340/5.42 |
| 5,872,850 | A * | 2/1999 | Klein | G06Q 30/06 |
| | | | | 705/51 |
| 6,817,521 | B1 * | 11/2004 | Matada | 235/380 |
| 6,880,761 | B1 * | 4/2005 | Ritter et al. | 235/492 |
| 7,341,182 | B2 * | 3/2008 | Lai et al. | 235/380 |
| 7,581,678 | B2 * | 9/2009 | Narendra et al. | 235/451 |
| 7,604,163 | B2 | 10/2009 | Natsuno | |
| 7,810,729 | B2 * | 10/2010 | Morley, Jr. | 235/449 |
| 7,837,121 | B2 * | 11/2010 | Kelley et al. | 235/492 |
| 7,958,057 | B2 * | 6/2011 | Al-Herz et al. | 705/69 |
| 8,107,927 | B2 * | 1/2012 | Sivaram et al. | 455/411 |
| 8,186,586 | B2 * | 5/2012 | Maddocks | 235/382.5 |
| 8,511,548 | B1 * | 8/2013 | Mori et al. | 235/380 |
| 2003/0055792 | A1 * | 3/2003 | Kinoshita et al. | 705/67 |
| 2004/0206815 | A1 * | 10/2004 | Tarnovsky et al. | 235/382 |
| 2005/0108559 | A1 * | 5/2005 | Suzuki | H04L 1/0061 |
| | | | | 713/193 |
| 2005/0247787 | A1 * | 11/2005 | Von Mueller et al. | 235/449 |
| 2005/0269402 | A1 | 12/2005 | Spitzer et al. | |
| 2006/0000900 | A1 * | 1/2006 | Fernandes et al. | 235/380 |
| 2006/0071065 | A1 * | 4/2006 | Jain | G06K 7/0008 |
| | | | | 235/380 |
| 2006/0091200 | A1 * | 5/2006 | Lai et al. | 235/380 |
| 2006/0236117 | A1 * | 10/2006 | Lazaridis et al. | 713/185 |
| 2006/0237529 | A1 * | 10/2006 | Kelley et al. | 235/380 |
| 2006/0259425 | A1 * | 11/2006 | Jennings et al. | 705/40 |
| 2007/0055630 | A1 * | 3/2007 | Gauthier et al. | 705/44 |
| 2007/0057038 | A1 * | 3/2007 | Gannon | 235/380 |
| 2007/0278291 | A1 | 12/2007 | Rans et al. | |
| 2008/0010190 | A1 | 1/2008 | Rackley, III et al. | |
| 2008/0017704 | A1 * | 1/2008 | VanDeburg et al. | 235/380 |
| 2008/0089517 | A1 * | 4/2008 | Bianco et al. | 380/259 |
| 2008/0164307 | A1 | 7/2008 | Silverstein | |
| 2008/0243703 | A1 * | 10/2008 | Al-Herz et al. | 705/69 |
| 2009/0070272 | A1 * | 3/2009 | Jain | 705/75 |
| 2009/0078777 | A1 * | 3/2009 | Granucci | G06Q 20/105 |
| | | | | 235/492 |
| 2009/0100511 | A1 | 4/2009 | Phillips et al. | |
| 2009/0122984 | A1 * | 5/2009 | Fascenda et al. | 380/247 |
| 2009/0143104 | A1 * | 6/2009 | Loh | G06Q 20/32 |
| | | | | 455/558 |
| 2009/0144183 | A1 * | 6/2009 | Gatchell et al. | 705/34 |
| 2009/0254440 | A1 * | 10/2009 | Pharris | 705/17 |
| 2009/0265552 | A1 * | 10/2009 | Moshir et al. | 713/168 |
| 2009/0307132 | A1 * | 12/2009 | Phillips | 705/41 |
| 2010/0088188 | A1 * | 4/2010 | Kumar | G06Q 20/10 |
| | | | | 705/17 |
| 2010/0093331 | A1 * | 4/2010 | Rooks et al. | 455/418 |
| 2011/0218911 | A1 * | 9/2011 | Spodak | 705/41 |
| 2011/0302646 | A1 * | 12/2011 | Ronda et al. | 726/9 |
| 2012/0011070 | A1 * | 1/2012 | Ward et al. | 705/72 |

OTHER PUBLICATIONS

International Search Report and Written Opinion dated Jan. 16, 2012 for International PCT Application No. PCT/US2011/045388, 9 pages.
Search Report dated Sep. 22, 2014 in European Patent Application No. 11815078.8, 8 pages.
Non-Final Office Action dated Nov. 9, 2017, in U.S. Appl. No. 15/480,233, 17 pages.
Search Report dated Sep. 22, 2014 in European Patent Application No. 11815079.8, 8 pages.

\* cited by examiner

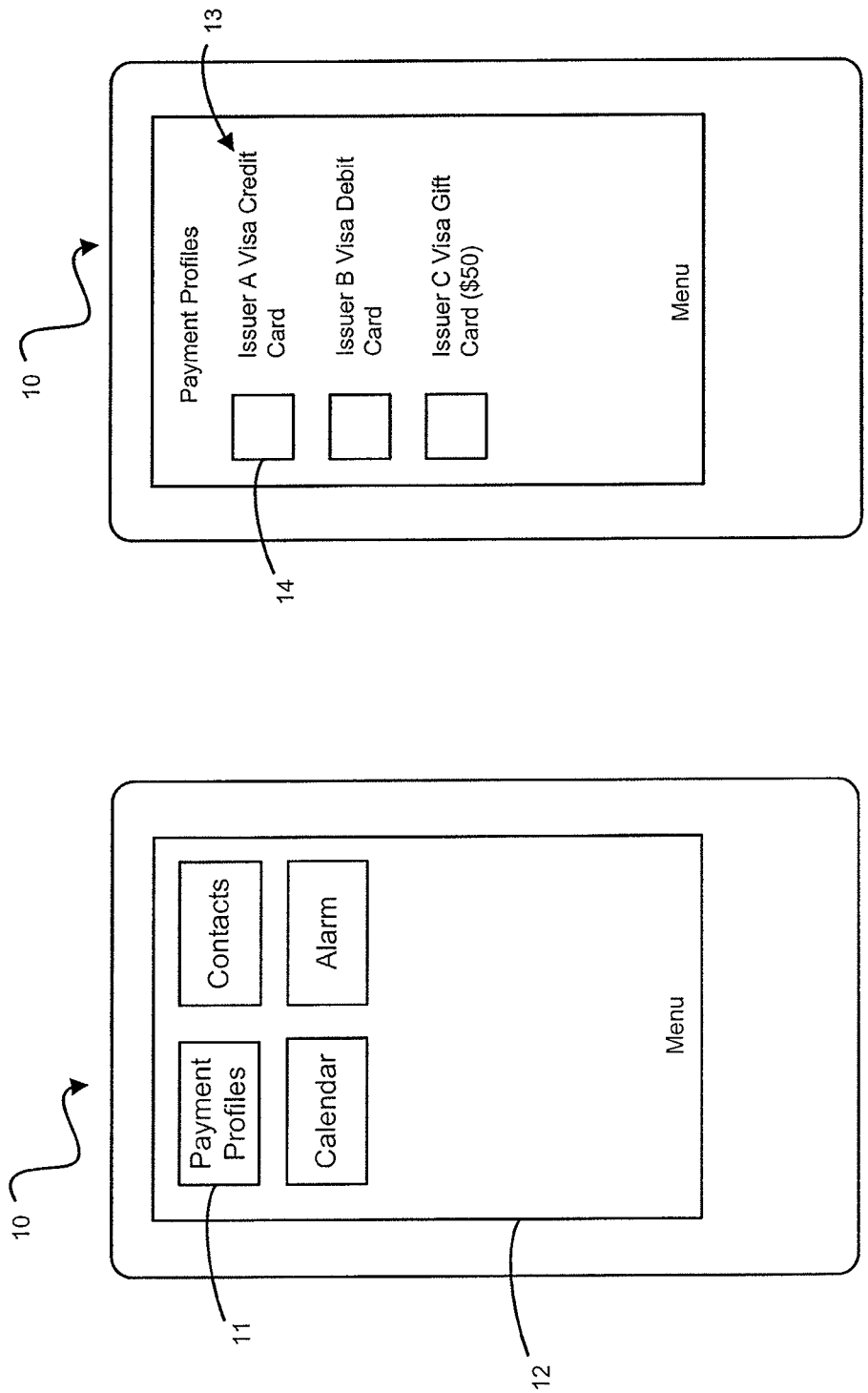

PROGRAMMABLE CARD

The present application is a non-provisional of and claims priority to U.S. Provisional Application No. 61/367,646, entitled "PROGRAMMABLE CARD," filed on Jul. 26, 2010, the entire contents of which are herein incorporated by reference for all purposes.

BACKGROUND

Consumers and merchants can use a number of different payment mechanisms. For example, a consumer may have a contact chip credit card and a magnetic stripe debit card, each belonging to a different credit card association (CCA). This can cause problems for both to the consumer and the merchant as sometimes the merchant does not support the payment type (i.e., CCA) or payment format (e.g., contact chip, magnetic stripe) of the consumer's payment device. If the merchant does not use a particular payment device held by the consumer in a transaction, then the consumer may not be able to complete the transaction. Additionally, in some cases, it is not apparent what forms of payment a merchant accepts until the consumer actually interacts with that merchant. Furthermore, countries such as Canada only allow the use of only one type of payment transaction (e.g., only chip type transactions) and it is difficult if not impossible to use other types of payment mechanisms (or form factors) in such countries.

Also, consumers can also carry many other types of financial devices such as loyalty devices (e.g., a loyalty card). Consumers are often burdened with carrying too many financial devices.

Embodiments of the invention address these and other problems, individually and collectively.

BRIEF SUMMARY

Embodiments of the present invention relate to improved systems and methods for completing a transaction with a payment device that can be programmed with multiple payment profiles. These improved systems and methods can allow for both consumer ease of use and merchant ease of use during a transaction. The payment profiles can include different payment types and different payment formats that are accepted by merchants. The payment device can provide a number of interfaces through which a transaction can be completed (e.g., contact, contactless). Thus, embodiments of the invention can merge all forms of payment into a single payment device and can also remain within government regulations.

Aspects further include a mobile device, system and computer readable storage medium configured to program the payment device with the payment profiles. The mobile device can securely store the payment profiles in a memory element, display identifiers of the payment profiles to a user, receive an input selection of the payment profile and program (e.g., write) the selected payment profile onto the payment device. Although the programming of a payment device with payment profile are described in detail, as explained below, embodiments of the invention are not limited to only payment profiles and a payment card. Embodiments of the invention can use of any suitable payment, gift card, prepaid, checking, loyalty or other account for programming onto a programmable card.

One embodiment of the invention is directed to a mobile device that is capable of programming a payment device. The mobile device comprises a processor, a memory element configured to store a payment profile, a display configured to display a payment profile identifier of the payment profile to a user of the mobile device, an input element configured to select the payment profile through selection of the identifier, a communication interface configured to communicate with the payment device, and an output element configured to write the selected payment profile onto the payment device. The payment profile information is inaccessible to a user of the mobile device. The memory element, the display, the input element, the communication interface and the output element are each operatively coupled to the processor.

Another embodiment of the invention is directed to a method comprising displaying a plurality of payment profile identifiers for a plurality of payment profiles on a display of the mobile device, receiving a selection of a payment profile in the plurality of payment profiles through selection of a payment profile identifier in the plurality of payment profile identifiers, and writing the selected payment profile to a payment device that is coupled to the mobile device. The plurality of payment profiles is securely stored in a memory element of the mobile device. Information included in the payment profile is not accessible to a user of the mobile device.

These and other embodiments of the invention are described in further detail below.

BRIEF DESCRIPTION OF THE DRAWINGS

FIG. 1A shows a mobile device having an application that displays payment profiles to a user of the mobile device according to an embodiment of the invention.

FIG. 1B shows the mobile device application of FIG. 1A that provides a listing of the identifiers for the payment profiles according to an embodiment.

DETAILED DESCRIPTION

Figure 1C:
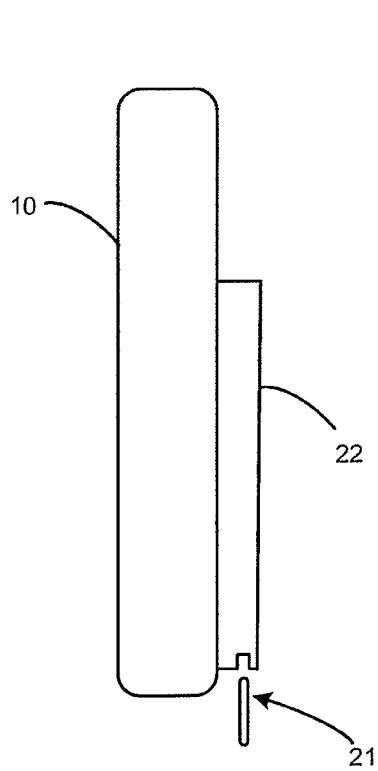
FIGS. 1C-1D show a mobile device including a communications interface within a module capable of receiving a payment device according to an embodiment.

Embodiments of the invention are directed to a mobile device and a method. They can be used to provide a user with a single payment device that can be programmed with a plurality of payment profiles. The payment profiles can be stored on the mobile device in a memory element, such as a MicroSD chip. The information in the payment profile is not directly accessible to the user of the mobile device. Rather, an identifier of the payment profile is displayed on the mobile device, so that the user can select which profile is to be programmed onto the payment device. The payment profiles can also be encrypted when they are stored on the memory element of the mobile device. This encryption can occur when the payment profile is stored, e.g., by the mobile device, or prior to the payment profile being received by the mobile device, e.g. through the issuer.

The memory element in the mobile device can be any suitable data storage element that includes a volatile memory, a non-volatile memory, or any combination thereof. It can also be partitioned into regions. Each region can individually be secured (e.g., using appropriate secured and unsecured file structures) so that the memory element can be utilized by the mobile device to store information which is both accessible (e.g., contacts, calendar, etc.) and inaccessible (e.g., payment profile) to the user.

Each payment profile can include payment profile information, which can include full card profile information found on physical payment devices, such as contact and contactless credit cards, gift cards, debit cards, loyalty cards, etc. The payment profile information can also include additional information such as loyalty program information, and cryptographic keys. In some embodiments, the payment profile information can include multiple payment formats, such as magnetic stripe format and chip format. Additionally, the payment profiles can be linked to card profiles belonging to a number of different issuers and credit card associations, each having information and formats particular to them. For example, payment profiles could include a Bank of America MasterCard profile, a Citibank debit card, a Visa gift card, etc.

The payment profiles can be received through one or more interfaces (e.g., wireless, wired, contact) of the mobile device and stored on a memory element of the mobile device. Identifiers for the payment profiles can then be displayed to a user of the mobile device. The user can select a payment profile identifier for the payment profile with an input element on the mobile device. The selected payment profile is then written by an output element through a communication interface (e.g., RF chip) to a payment device which is coupled to the mobile device.

In some cases, the payment device is in the form an ordinary payment device such as a credit or debit payment device. The payment device can include a memory structure, such as a memory chip. The memory structure can be coupled to an antenna of a contactless element, or a wired to a contact chip plate on a contact chip interface. The memory structure can also include a magnetic stripe, such that the payment profile information can be used in at least two different types of payment formats. Once the payment device is programmed with the selected payment profile, the payment device can be utilized at any merchant location to complete a transaction. The payment profile programmed on to the payment device can then be erased, e.g., naturally over a predetermined amount of time, or by interfacing the payment device with the mobile device.

Prior to discussing the specific embodiments of the invention, some terms can be described in further detail.

A "mobile device" can be a portable device in any suitable form such as a cellular telephone, smartphone, laptop computer or other portable device, which includes a memory element and a communications interface. The mobile device can also include various input elements (e.g., buttons, microphones, etc.) and output elements (displays, speakers, etc.). In some embodiments, the mobile device can be coupled to network via a wired or wireless interface in order to receive payment profiles over a network (e.g., Internet) from an issuer. In such an embodiment, the mobile device can further include an antenna coupled to one or more wireless interfaces which support connection to a cellular network and/or a wireless local area network (WLAN).

A "memory element" can include any element, which is capable of storing data. The memory element can include either volatile memory or non-volatile memory or a combination thereof. For example, the memory element can include one or more of a random access memory (RAM), read only memory (ROM), flash memory (e.g., microSD, SD) and integrated circuit chip (e.g., SIM card). Accordingly, the memory element can be formed in the mobile device or removable from the mobile device, such as in the case of a microSD card. The memory element can be coupled to the processor of the mobile device, which provides instructions to read information out of the memory element, write information into the memory element and/or execute applications which can also be stored in the memory element. The memory element can be partitioned so that certain areas, or regions, are accessible and/or inaccessible by the device. In such an embodiment, specific areas of the memory element can be secured, or protected. Encryptions keys can be used for this and other purposes. The term 'memory element' can also be a computer readable medium (CRM).

A "display" can be an example of an output element capable of displaying information such as payment profile identifiers. The display can be the screen of a mobile device, which is utilized to visually display graphics to a user of the mobile device. For example, the display can include light emitting diode (LED), liquid crystal display (LCD), electroluminescent and other types of displays.

A "payment profile" can be a collection of information associated with a particular payment account. It may optionally be associated with a particular payment device. For example, a consumer may have a Bank of America credit card, which is associated with a Bank of America credit card account 7891234. The corresponding payment profile can be a Bank of America credit card profile for account number 7981234. The payment profile can be programmed into a payment device, such that the payment device includes payment profile information which would be included if that device were pre-programmed by the issuer and sent to a user.

"Payment profile information" may be any suitable information that is associated with a payment profile. For example, payment profile information may include full card profile information such as an account number, issuer phone number, card number, expiration date, user information, service code, issuer information (e.g., an issuer name or issuer identifier), chip data, card verification values (e.g., CVV1, and CVV2), digital card verification values (e.g., dCVV2), and card verification keys (e.g., CVK). Other information may include user information such as a billing address, name, phone number, etc. Such information is generally personal to the user and is not information that is intended to be widely distributed.

In some embodiments of the invention, the payment profile information can also include information related to loyalty programs with which the user is affiliated. For instance, in some cases, a universal loyalty number can be assigned to a card for use at multiple merchant locations during a transaction. In other embodiments, a number of loyalty accounts can be provided to the user on the display of the device (i.e., separate from the payment profile identifier) and the loyalty number can be programmed onto the payment card when payment profile is programmed onto the payment card. In other embodiments, the payment profile information can include security information, such as an encryption key, which can be utilized to verify the payment device prior to writing the payment profile onto the payment device.

The payment profile information can be inaccessible to the user of the mobile device. That is, the user of the device cannot view and/or extract any payment profile information (e.g., account number, CVV, etc.) which is stored on the payment device. Common encryption techniques, such as PKI or symmetric key encryption, can be used to make the payment profile information inaccessible to the user. The key used to access the information can be stored on the payment device and can used to decrypt the information prior to writing a selected payment profile onto the payment device.

A "payment profile identifier" can be any character string that can be used to identify a payment profile. For example, a payment profile for a credit card issued from an Issuer A, may have an identifier "Issuer A—Credit Card" or, simply, "Account 1." In other embodiments, the payment profile identifier could include part of an actual account number (e.g., "Card ending in 8795"). The payment profile identifier can include any alphanumeric combination and may be a generic identifier which is determined by the type of payment profile, or may be an identifier which is determined by the user of the mobile device. For example, the mobile device can include an application which can display a plurality of payment profile identifiers and a selected payment profile identifier on the display of mobile device to the user. The application can also include functionality which allows the user to program a payment profile identifier for each payment profile stored in the memory element.

"Payment formats" can include different data formats for payment data. Such formats may include structures of specific data fields, and/or particular combinations of data elements. Examples of different payment formats may include a magnetic stripe data format and a chip type data format.

"Chip type data" can include payment data, and any other payment profile information communicated during a transaction, in a chip type format. The format differs from the magnetic stripe format, which is most commonly known and utilized in the United States. The chip type data can be in any standard known in the art and follow any communications protocol known in the art (e.g., contact/contactless information transfer). The chip type data can include payment profile information which is usually found on magnetic stripes, plus additional security data, such as digital signatures, and on-chip generated cryptographic keys.

"Magnetic stripe data" can be any standard known in the art and can include Track 1, Track 2 or Track 3 type formatting. Magnetic stripe data and formatting can also be referred to as legacy type data and legacy type format. Magnetic stripe data may include an account number, CVV values, expiration date, service code, etc.

"Memory structures" can be any storage medium located on the payment device, which is utilized maintain the payment profile data for use during a transaction. For example, a memory structure can include a magnetic stripe or a memory element located in an IC chip.

"Customer loyalty information" can include any loyalty program information that is associated with an issuer, merchant and/or credit card association. The loyalty information can include a loyalty number for each program to which the user belongs, or a universal number which can be registered by the user and/or merchant to receive rewards from merchants associated with a particular payment profile.

An "input element" can include any element which can allow for a displayed payment profile to be selected on the mobile device. For example, an input element can include a keyboard, a mouse, or touchscreen.

A "communication interface" can be any interface which allows for the transfer of data from a first device (e.g., a mobile device) to a second device (e.g., a payment device), or vice-versa. Examples of communication interfaces include an antenna, a wireless communication port (e.g., a port that provides radiation), and a magnetic device such as a magnetic head that is used to write payment profiles onto a magnetic stripe of the payment device. The communication interface can use any suitable electrical, optical, and/or magnetic mode of operation to transfer data.

An "output element" can be any suitable device capable of outputting data. Examples of output elements include displays, speakers, etc.

A "control application" can be a program stored on a computer readable medium, which includes instructions to control the functions of the mobile device. The control application can run when an input of the selected payment profile is received by the mobile device. It can control the reading of the selected payment profile from the memory element and the writing of the selected payment profile to the payment device via the communication interface. The control application can control the communication exchange (e.g., by key exchange) between the payment device and the mobile device through the communication interface.

The term "operatively coupled" can refer to two or more elements that function together. For example, a processor of the mobile device can be operatively coupled to a memory element in order to implement stored instructions. The processor and the memory element may be operatively coupled together.

A "payment device" can include any suitable device, such as a card, including a credit card, debit card, loyalty card, or other charge card. The payment device can be any device which is capable of communicating the payment profile information to a point of sale terminal and can be in any form, shape or size acceptable by the point of sale terminal.

I. Devices and Systems

FIG. 1A shows a mobile device 10 including a display 12. The display 12 can provide a menu of applications (e.g., payment profile application 11) which can be run on the mobile device 10. The applications can include applications that are commonly used on mobile devices, such as alarm clocks, photo gallery, contacts, calendar, settings, etc. The payment profile application 11 can be pre-installed on the mobile device 10 to include cryptography to secure any payment profile received by and stored on the mobile device 10. In alternative embodiments, the payment profile application 11 can be received when a payment profile is stored on the mobile device 10, such as by the issuer of the payment profile or by a third party which provides software solutions for the mobile device 10.

The user of the mobile device 10, can use an input element, such as a button or key (not shown), or a portion of a touch-sensitive display (e.g., touchscreen) to select the payment profile application 11. The selection of the payment profile application 11 by the user causes the application 11 to run. The application can include any amount of personalization by the user and/or the developer of the applications, such as the mobile device manufacturer or programmable payment device manufacturer. When the payment profile application 11 is run, a listing of payment profile identifiers 13 is displayed to the user as shown in FIG. 1B. The payment profile identifiers 13 can be pre-selected by an issuer of a payment profile. For example, when the profile is stored on the mobile device, a default identifier is assigned to that profile. Alternatively, the user can be prompted by the application to enter an identifier (e.g., name) for the payment profile being stored on the mobile device 10 and/or modify a default identifier.

In an exemplary embodiment of the invention, a payment profile identifier 13 can include a short description of the payment profile, e.g., Issuer A—Visa Credit Card. The payment profile identifiers 13 can be shown as a listing with a button (e.g., box 14) used to select a particular identifier. In some embodiments, the user can scroll through the listing in order to make a selection, or use voice recognition commands select a particular payment profile identifier. The listing can also provide numbering of the payment profiles in a list. Accordingly, by entering "1" on a keypad or saying "one", the user can effectively select the payment profile listed as number "1."

Once the user selects a particular payment profile identifier 13, the application can exit and/or provide the user with additional instructions. In some embodiments, the instructions may include written instructions to "Place your payment device into mobile device interface." The application can also provide an indication to the user when it is safe to remove the payment device from the mobile device interface. Referring back to FIG. 1A, in one embodiment, when the application is closed and the payment device has been programmed, the application icon 11 can display the identifier 13 of the payment profile which was last programmed onto the payment device.

Referring now to FIG. 1C, the mobile device 10 can include a module 22 which can be formed on or connected to the housing of the mobile device 10. The module can be a connection device and can have any suitable form and can be made of any suitable materials. In some embodiments, the module 22 can be a thin, planar structure with a receiving area (e.g., a recess) that is cooperatively structured to receive a payment device.

Figure 1D:
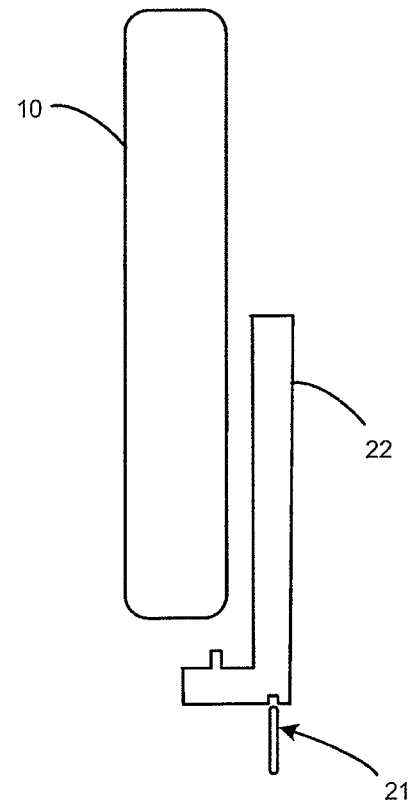

In some embodiments, as shown in FIG. 1D, the module 22 can be removable from and coupled to a main housing of the mobile device 10 through a port (e.g., e.g., a USB port) (not shown). The module 22 can include a payment device receiving portion and a communication interface for writing the payment profile onto the payment device 21. In such an embodiment, the payment profile can be written to the output element (e.g., port) in which the module 22 is interfaced. Accordingly, the module 22 can include a magnetic stripe reader/writer, a contact chip plate and/or an optical transmission element, such that when the payment device 21 is inserted into the module 22, the payment profile is written through a communication interface onto the payment device 21. In some embodiments, the module includes a communication interface designed specifically for communication with a communication interface (e.g., FIG. 2C: 21(f)) on the programmable card.

In other embodiments, the module 22 is not provided in the mobile device 10. In such embodiments, the payment device 21 can be brought within proximity to the mobile device 10 in order to receive the payment profile through a wireless communication interface (e.g., antenna) in the mobile device 10. In another embodiment, the mobile device 20 can include a communication interface such as a contact chip plate, located externally on the housing of the mobile device 10. The payment device 21 can be interfaced (form contact with) the contact chip plate and the payment profile can be written on the payment device 21.

Figure 2:
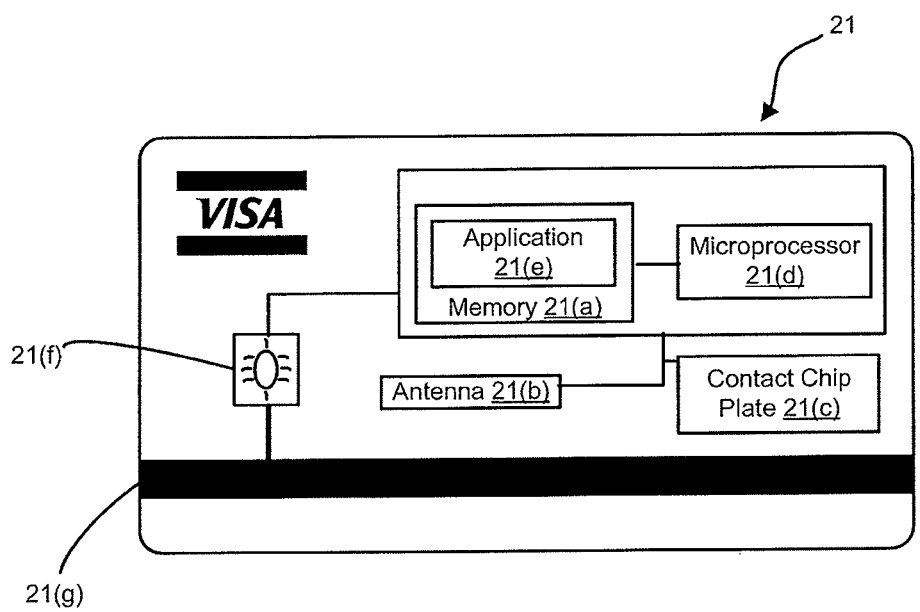
FIG. 2 shows an example of the payment device in FIGS. 1C-1D according to an embodiment.

Referring now to FIG. 2, an exemplary payment device is illustrated. The payment device 21 can be a payment card, similar to a credit, debit or gift card and include both an IC chip and a magnetic stripe. The card can include both contact and contactless interfaces. The contact interfaces can include, for example, a magnetic stripe 21(g), a contact chip plate 21(c), and a communication interface coupled to the IC chip and capable of receiving the payment profile from a mobile device (not shown). The contactless interface can include an antenna 21(b) coupled to the IC chip. It may be capable of near field communication (NFC). The inclusion of a contactless interface ensures that the payment device 21 can be used worldwide, even in markets such as, e.g., Canada, where merchants are not required to accept all types of payment devices.

The IC chip can further include a memory 21(a) for storing payment profiles and an application 21(e), which includes code for causing a microprocessor 21(d) to perform functions, such as reading/writing payment profiles through interfaces, storing/retrieving the payment profiles in the memory, and erasing payment profiles dependent on specified criteria (e.g., predetermined time period). Each interface 21(c), 21(b), 21(f) can be operatively coupled to the IC chip in which the memory 21(a) is operatively coupled to the microprocessor 21(d). The magnetic stripe 21(g) can be independently programmed with payment profiles, which are stored, read and written in a legacy type format.

If the payment device is in the form of a card 21 in FIG. 2, the payment device can be made of a plastic substrate. The contactless and contact interfaces can be present on or embedded within the plastic substrate. Additionally, in some embodiments, the payment device holder's information, such as an account number, expiration date, and user name may be printed or embossed on the card.

In other embodiments, the IC chip on the payment device can be established in such a way as to have a natural decay of information over a period of a couple of minutes, so that if the user's payment device is lost or stolen, the information will decay rendering the payment device useless. In further embodiments, the application 21(e) can also project an image of the payment device onto the mobile device screen for use in a payment device-not-present transaction (CNP), and can provide an additional area for marketing or loyalty messages.

II. Transaction Systems

Figure 3:
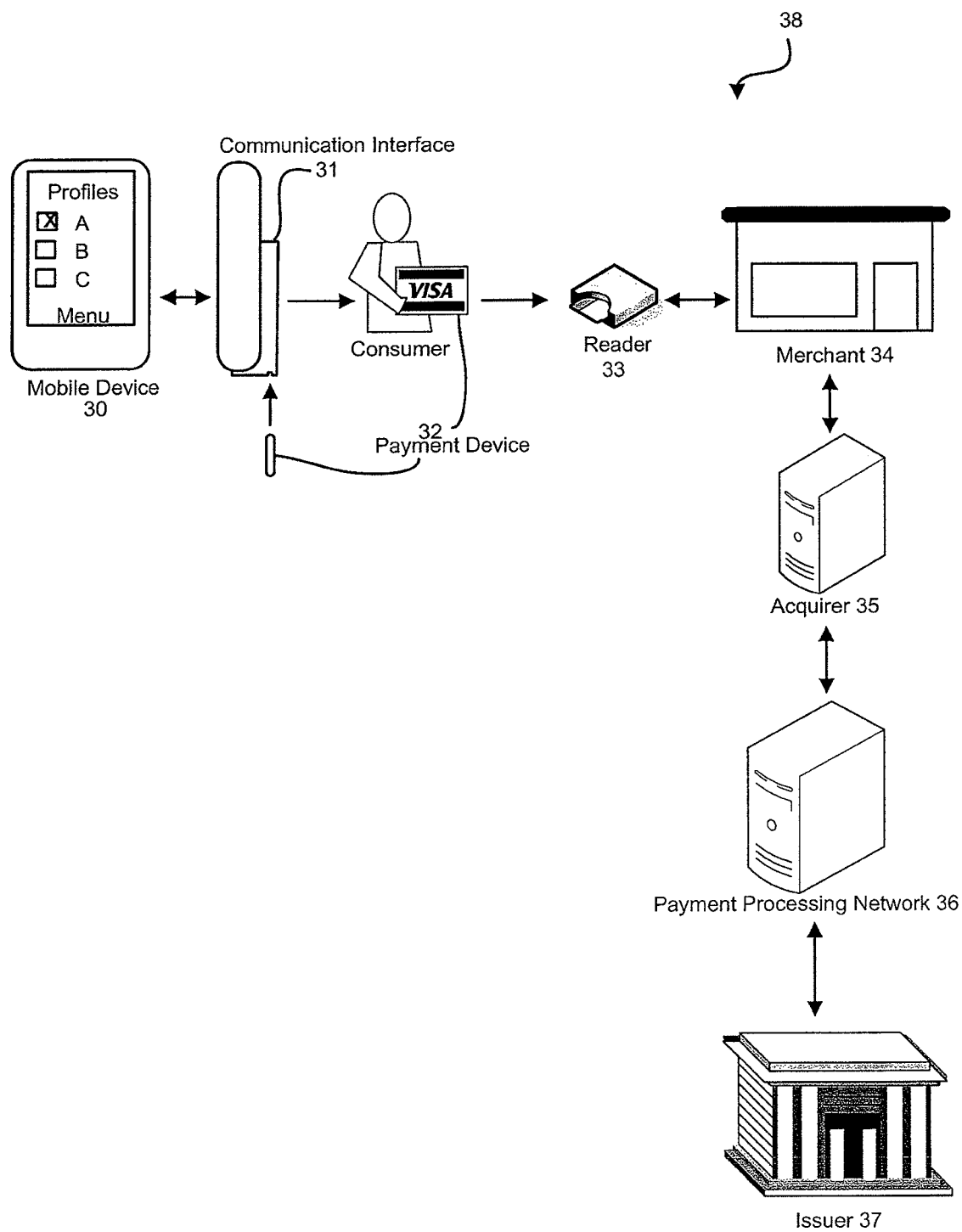
FIG. 3 shows an exemplary system that can be used with embodiments of the invention.

Turning to FIG. 3, system 38 is shown which is configured to facilitate real-time point-of-sale transaction with the payment device programmed in accordance with an embodiment of the present invention.

The mobile device user can select a payment profile on the mobile device 30. As shown, the user selects the payment profile having the payment profile identifier "A." The user can then interface the payment device 32 with the mobile device through communication interface 31. As previously described with reference to FIGS. 2A-2B, the communication interface 31 can be part of a payment device receiving module which is coupled to the mobile device 30 or, alternatively, can be a part of the mobile device 30.

In some embodiments, during the transfer of the payment profile information onto the payment device 32, a two way communication can occur. The two way communication can include a key exchange between the payment device 32 and the mobile device 30, to ensure that the proper payment device 32, associated with the mobile device 30, is interfacing with the mobile device 30. If an improper payment device interfaces with the mobile device 30, the selected payment profile will not be written to the payment device 32 and the user may receive an error message, which can be displayed on the display of the mobile device 30. In further embodiments, the incorrect interfacing of a payment device with the mobile device over a predetermined number of times can cause the application and/or memory element, in which the payment profile is stored, to lock, requiring an issuer of a payment profile, payment device or mobile device to unlock the device.

If the correct payment device 32 interfaces with the mobile device 30, the selected payment profile (e.g., "A") can be programmed onto the payment device 32. The payment device holder (e.g., "consumer") can then use the payment device 32 similar to a preprogrammed payment device at a merchant location. For example, if the payment device is in the form of a card (e.g., a credit card), the consumer can use the card with an access device (which may include card reader 33) at a merchant 34 location. The payment profile information can be read from a magnetic stripe, a contact chip plate or a contactless element in the payment device 32. The payment profile information stored on the payment device 32 can be read by the reader 33. By utilizing the existing payment device form factor, existing acceptance devices, such as automated teller machines (ATMs) and contact or contactless point-of-service devices (POS devices) can be used. Significant changes to the existing payments infrastructure are not needed.

The merchant's 34 acceptance device can be connected to the Internet, or other communication medium. The acceptance device can forward the payment information, and any additional merchant 34 information, in an authorization request message to a payment processing network 36 visa an acquirer 35. The payment profile information can include information regarding the type of payment account that is to be associated with the payment device. Such information may include the payment association and/or issuer associated with (e.g., Visa) the payment profile information is programmed on the payment device. Such information may also include information regarding the type of account that is to be associated with the payment device (e.g., a credit, debit, or prepaid account).

An "authorization request message" may be a message that includes an issuer account identifier. An example of an issuer account identifier can be a primary account number. A primary account number may include an issuer code, which is typically six characters long and identifies the issuer 37. The authorization request message may request that the issuer 37 authorize a transaction. An authorization request message according to an embodiment of the invention may comply with standards such as ISO 8583.

The payment processing network 36 can include any suitable payment network configured to facilitate real-time point-of-sale transaction authorization approval. In some embodiments, a server computer (or other suitable computational apparatus) associated with the payment processing network 36 receives an authorization request message from the merchant 34 (e.g., directly or through an acquirer 35), and forwards the authorization request message to the issuer 37. The issuer 37 determines if sufficient funding or credit line is available to the user. The issuer 37 can be a bank or other suitable institution.

The payment processing network 26 may include data processing subsystems and networks, and can be configured to implement operations used to support and deliver authorization services, exception file services, and clearing and settlement services. An exemplary payment processing network may include VisaNet. Payment processing networks such as VisaNet are able to process credit payment device transactions, debit payment device transactions, and other types of commercial transactions. VisaNet, in particular, includes a VIP system (Visa Integrated Payments system) which processes authorization requests for transactions and a Base II system which performs clearing and settlement services for the transactions.

As noted above, the payment processing network 36 can include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 36 may use any suitable wired or wireless network, including the Internet, to facilitate communications and data transfer between its component system elements.

Referring back to FIG. 3, once the issuer 37 approves or denies a transaction, an authorization response message is forwarded to the merchant 34 via the payment processing network 36 and the acquirer 35. In some embodiments, the access device (which may include the reader 33) includes a display. The display can indicate whether the transaction is approved or denied. However, if the consumer's mobile device 30 is NFC capable, the access device can, alternatively, send transaction details and approval/denial directly to the mobile device 30.

III. Methods

Figure 4:
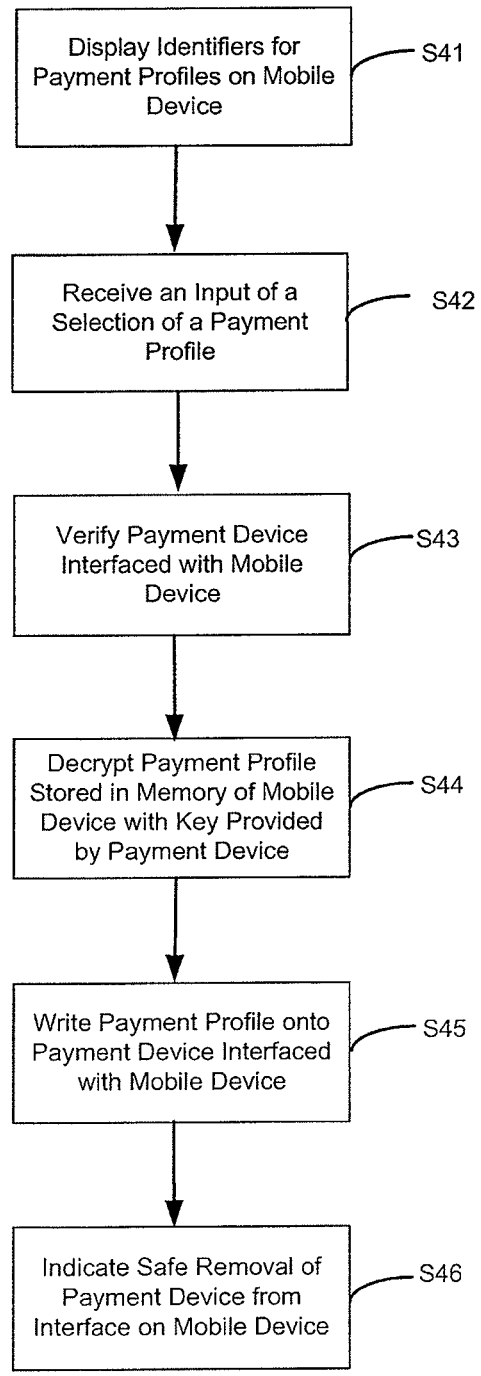
FIG. 4 shows a flowchart of a method for programming a payment profile onto a payment device according to one embodiment.
Figure 5:
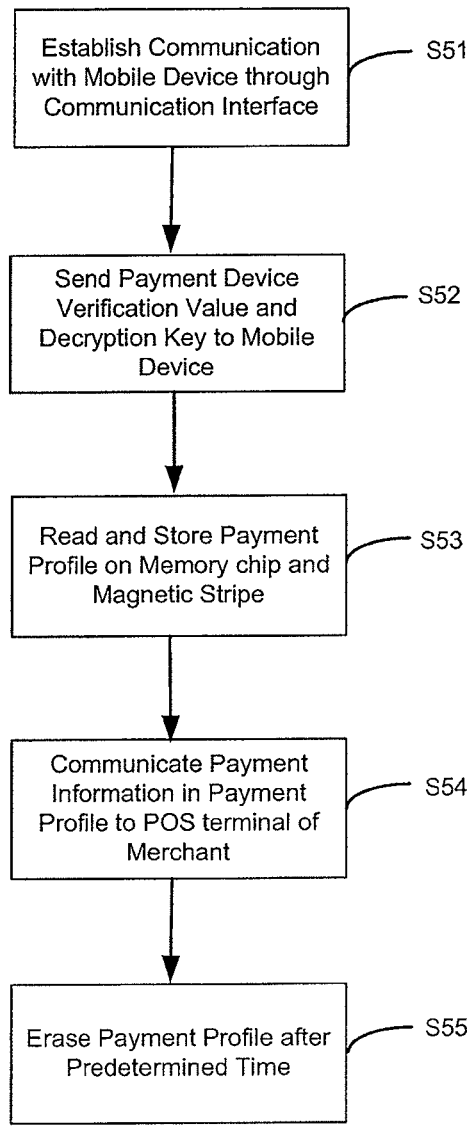
FIG. 5 shows a flowchart of a method for receiving and using a payment profile on a payment device according to an embodiment.

Some methods for programming a payment device and subsequent use of the payment device are provided in the flowcharts shown in FIGS. 4-5. Some embodiments of the invention are described in further detail below.

Referring now to FIG. 4, a method 40 for programming a payment profile onto a payment device with a mobile phone is shown. Method 40 is described with reference to FIGS. 1A-1D.

In S41, a listing of payment profile identifiers 13 is displayed on a display in a mobile device. The payment profile identifiers 13 can be utilized to provide a short description of the payment profiles which the user of the mobile device 10 has stored on the mobile device 10. The payment profile identifiers 13 can be provided through a payment profile application 11 which is stored on the mobile device 10 to control the use of the payment profiles. For example, the application 11 can cause the mobile device to read, store, encrypt and assign identifiers 13 of the payment profiles, though each of these functions are transparent to a user of the mobile device 10. The application 11 can provide the listing of the payment profile identifiers 11 to the user, and allow the user to input a selection of the payment profile for programming onto a payment device 21 that interfaces with the mobile device 10 as shown in FIGS. 1C-1D. Furthermore, the application 11 can run in order to provide verification of the payment device 21 when the payment device 21 initially interfaces with the mobile device 20. The application 11 can decrypt the payment profile prior to storage on the payment device. In some embodiments, the aforementioned application 11 functions are controlled by multiple applications (not shown) on the mobile device, which are communicatively coupled to the payment profile application 11.

The payment profiles can be securely stored on the mobile device 10. The storing can occur at an issuer (e.g., bank), when a user applies for a payment account. For example, a mobile device user can enter a bank location, apply for a payment account (e.g., a credit card or debit card) and confirm his/her mobile device 10 with the bank. In some embodiments, the bank can then send the payment profile to the mobile device 10 through a wired connection, or through a wireless network, such as the cellular network or a local area network, for WiFi capable mobile devices. Alternatively, the mobile device 10 can be placed within proximity to a near field communication (NFC) terminal or "tapped" to a terminal at an issuer location to receive the payment profile. In the aforementioned embodiments, the mobile device 10 can include an external communication interface, such as a contact chip plate or radio frequency identification (RFID) chip.

In another embodiment, the mobile device 10 can form a secure wireless connection (e.g., through the Internet) with the issuer of a payment profile and receive the payment profile over the air at any location in which wireless connectivity is available. Alternatively, the mobile device 10 can be connection through a hard-wired connection to a computing device which is connected to the Internet to receive the payment profile.

In any of the aforementioned embodiments, the payment profile can be received from the issuer in a secure form. The payment profile can be encrypted by the issuing entity and both the payment profile and the decryption key can be stored in a secure location in a memory element of the mobile device 10. In some embodiments, the payment profiles can be encrypted a second time by cryptography which is implemented by the mobile device. As a result, the user cannot access the payment profiles. In some embodiments, the only decryption key which can be utilized to decrypt the payment profile and to access to the memory element where the payment profiles are stored is stored on the payment device 21.

Accordingly, the payment device can be used by and associated with a specific mobile device 10. That is, the payment device is associated with a particular mobile device 10. A stored key can be utilized to access the memory element of the mobile device 10 in which the payment profiles are securely stored. The association of a particular mobile device 10 with a particular payment device 21 adds an additional level of security to both the mobile device 10 and the payment device 21 if one or both is/are lost and/or stolen.

Referring back to FIG. 4, in S42, a payment profile identifier in the listing of payment profile identifiers is selected by a user of the mobile device. The payment profile identifier represents the payment profile which is securely stored in the memory element of the mobile device. The payment profile identifier is the only information about the stored payment profiles in which a user of the mobile device is able to access with the mobile device. When the payment profile identifier is selected through an input element, the payment profile associated with that identifier is read from the memory element and sent to an output element of the mobile device. In this stage, the payment profile is still in a secure form, the information in the payment profile being inaccessible to the user of the mobile device.

In S43, the payment device is verified by the mobile device. For example, the mobile device and the payment device can exchange a cryptogram, which is can be decrypted by a common symmetric key, which is shared by both the mobile device and the payment device. If each device successfully decrypts the cryptogram, the payment device is verified. This step can occur when the payment device is interfaced with the mobile device.

As mentioned previously, if the user attempts to interface the payment device with the mobile device and the payment device is not verified as being associated with the associated payment device, the payment device can lock. Additionally, the payment profile application on the mobile device and the memory element in which the payment profiles can similarly lock. This locking can prevent any further access to the payment profiles and the payment device, preventing fraudulent charges to occur. The mobile device can indicate to a user when the incorrect payment device is interfaced, such as through a visual message or other graphical indication, or a sound. The locking can occur after a predetermined amount of times in which the user attempts to interface the payment device with the mobile device or, in the case of a card receiving module, after a predetermined amount of time in which an incorrect payment device is left interfaced with the mobile device in the card receiving slot of the module.

In some embodiments, the user can leave the payment device interfaced (e.g., leave the payment device in the card receiving module) with the mobile device, and S41-42 are performed after S43.

Next, in S44, if the associated payment device 21 is interfaced with the mobile device 10, such as through insertion into the module 22, and a payment profile has been selected by the user, the payment profile is decrypted using a decryption key stored on the payment device 21. As mentioned in S41, the payment profile can be encrypted twice, using encryption keys stored on both the mobile device 10 and the payment device 21.

In S45, once the payment profile is decrypted by the mobile device 10, the payment profile is provided to a communication interface of the mobile device 10. The communication interface can be an antenna, contact chip plate, optical device that is capable of providing the payment profile to the payment device. If the mobile device includes a module 22 for receiving the payment device 21, such as shown in FIGS. 1C-1D, the communication interface can be located within and protected by the module 22.

Finally, in S46, the mobile device 10 can provide the user with an indication that the programming of the payment device 21 is complete and the user can safely remove the payment device 21 for use. In some embodiments, information relating to the programmed settings can be displayed for the user. For example, the user can be shown the payment profile identifier 13 of the payment profile which has been programmed on the payment device, as well as the time period allotted to use the payment device 21 (e.g., before the profile naturally decays). In other embodiments, such as for gift cards or loyalty accounts associated with a particular payment device, the loyalty points and/or card remaining balance can be displayed to the user of the mobile device 10. This limited amount of information stored in the payment profile can be accessed and collected by the application 11 after the payment profile is decrypted and being programmed on the payment device 21. However, the aforementioned payment profile information may not be readily accessible to the user at any time other than directly after the payment device 21 is programmed.

In further embodiments, S46 may be known to the user, e.g., such as provided in instructions for use which are provided with the payment device 21 and the mobile device, upon receipt. For example, the user may be instructed to leave the payment device 21 interfaced with the mobile device for a period of time, e.g., 5 seconds, after selection of the payment profile. In such an embodiment, an indication is not provided to the user prior to removal of the payment device from the interface of the mobile device 10.

Referring now to FIG. 5, a method 50 for using the payment device 21 is shown. Method 50 is described with reference to device elements in FIG. 2.

In S51, the payment device 21 is interfaced with an associated mobile device. The payment device 21 can be associated with the mobile device by the issuer of the mobile device or the payment device 21. Encryption and/or decryption keys used to secure provide for secure communications and information retrieval are stored in the memory 21(*a*) on the payment device 21. The payment device 21 and the mobile device can communicate when they are interfaced. The communication can be wireless through an antenna 21(*b*), such as on an RFID chip card, or through direct contact of the two devices, such as through a contact chip plate 21(*c*), or another contact interface 21(*f*), which made be unique to the payment device 21 and mobile device.

In S52, when communication is established, an application 21(*e*) on the payment device 21 can be triggered to run. The application can communicate instructions to the microprocessor 21(*d*) to send a cryptogram, such as a verification value, to the mobile device for verification of the interfaced payment device 21. In some embodiments, the cryptogram can be generated on the payment device 21 each time that the payment device 21 is interfaced with the mobile device. Simultaneously, or directly thereafter, the payment device 21 further communicates a decryption key stored in the memory 21(*a*) to the mobile device. If the payment device 21 is verified by the mobile device through the verification value, the key is then forwarded to the memory element to gain access to the payment profiles and/or decrypt the encrypted payment profiles stored in the memory element.

In S53, the decrypted form of the payment profile is then communicated back to the payment device 21 in response to the decryption key and verification value sent to the mobile device. The payment device 21 can receive the payment profile via a contact 21(*c*) or contactless 21(*b*) interface. In some embodiments, the payment device can include a contact interface 21(*f*) which is communicatively coupled to the magnetic stripe 21(*g*) and IC chip on the payment device. The contact interface 21(*f*) can be common and unique to the payment device 21, in order to facilitate communication of the payment profile during programming of the payment device 21. In some embodiments, the payment device 21 can receive payment profile information via two interfaces, such as through a magnetic stripe 21(*g*) interface and a contact chip plate 21(*c*) or NFC element (e.g., antenna 21(*b*)).

The decrypted payment profile can then be stored on the memory structures of the payment device, such as the magnetic stripe 21(*g*) and the memory 21(*a*) of the IC chip. The magnetic stripe 21(*g*) can act as an interface for receiving the payment profile as well as a memory structure for storing the payment profile. The contact chip plate 21(*c*) interface and the wireless (e.g., antenna 21(*b*)) interface receive the payment profile and communicate the profile to the memory structure (e.g., memory 21(*a*) in the IC chip for storage. Accordingly, the payment profile can be stored in more than one format, as the legacy type formatting used for storage on the magnetic stripe to conduct magnetic stripe transactions differs from the chip type formatting used for storage on the IC to conduct contact chip or contactless NFC transaction.

Next, in S54, after the payment profile is stored on the payment device 21, the payment device 21 can be utilized at a merchant location, automated teller machine, or other location to conduct a transaction with a POS terminal. The POS terminal can include an access device (e.g., a device reader), which is coupled to a merchant register. In some embodiments, the access device is the POS terminal and includes connectivity to the Internet or local area network (LAN) in order to forward an authorization request message to the issuer of the payment account, which is linked to the payment profile stored on the payment device 21. The payment device 21 can be utilized to communicate the stored payment profile through the magnetic stripe 21(*g*), antenna 21(*b*) or contact chip plate 21(*c*). Accordingly, whichever medium is accepted by the merchant, the payment device holder can provide.

In S55, in order to ensure that the information within the payment profile is protected, in case of a lost or stolen payment device 21, the IC chip can be configured to erase the payment profile after a predetermined amount of time. For example, this could be after a specified number of transactions (e.g., 1, 2, 3, etc.) have been conducted with the payment device 21, or, after a set amount of time (e.g., 1 hour, 2 hours, etc.). In the latter case, the memory structures on the payment device can allow for a natural decay of the payment profile information. In other embodiments, interfacing the device with the communication interface on the mobile device, such as through reinsertion of the payment device into the device receiving module can cause the payment profile to be erased.

III. Exemplary Computer Apparatuses, Mobile Devices and Access Devices

Computer apparatuses mobile devices and access devices which can be utilized in the methods and systems in previous sections are further described with reference to FIGS. 6-8.

Figure 6:
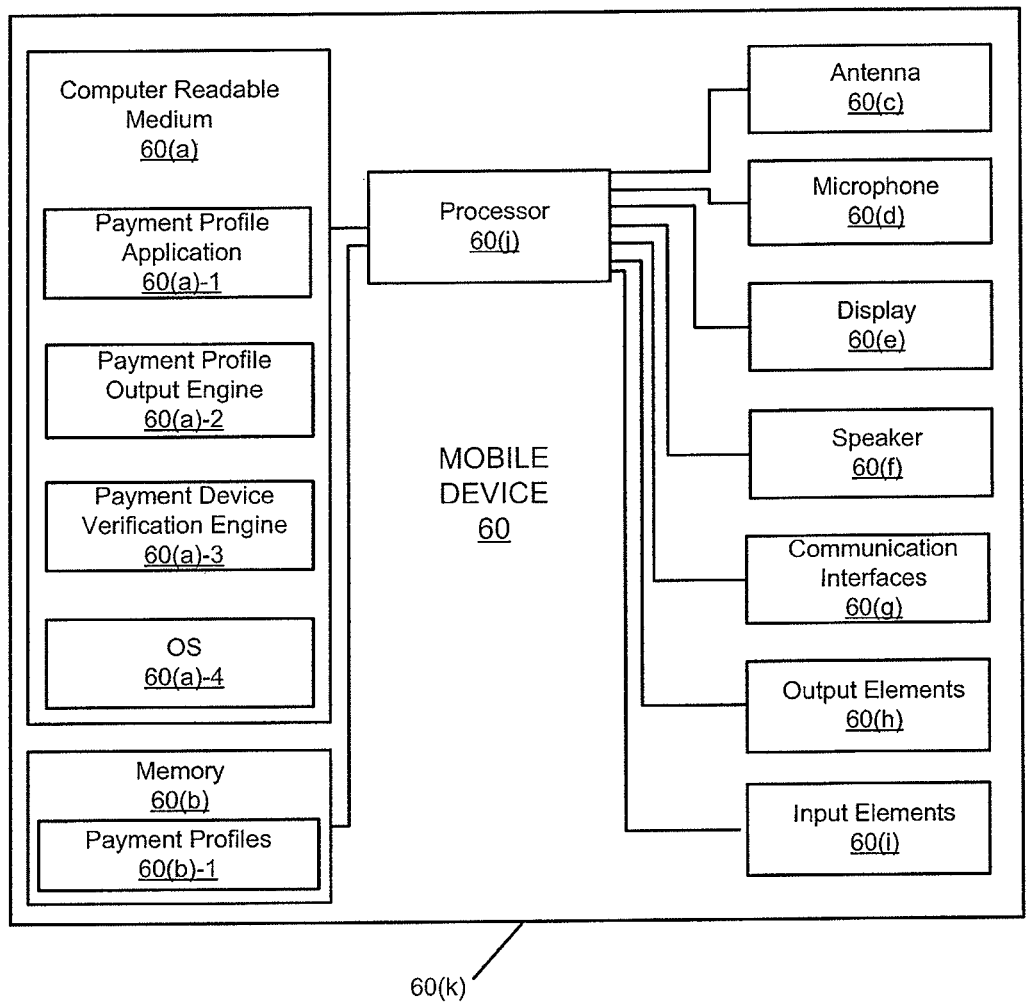
FIG. 6 shows a block diagram of an exemplary mobile device according to an embodiment.

Referring now to FIG. 6, a block diagram of a mobile device 60 in the form of a cellular telephone that can be used in embodiments of the invention is provided. The mobile device can be both as a device for programming a payment device (e.g., through a communication interface), as well as a portable payment device that can be used during transactions (e.g., in a CNP transaction). The exemplary mobile device 60 can comprise a computer readable medium 60(*a*) and a body 60(*k*) as shown in FIG. 6. The mobile device 60 can further include a module for receiving a programmable payment device (not shown), and the module can be formed on the body 60(*k*), or can be detachable from it. The body 60(*k*) can be in the form a plastic substrate, housing, or other structure.

The computer readable medium 60(*a*) can be in the form of (or may be included in) a memory element that stores data (e.g., applications) and can be in any suitable form including a microSD chip, SIM card, or other type of memory element. The computer readable medium can store applications (e.g., payment profile application 60(*a*)-1), programs (e.g., payment profile output engine 60(*a*)-2, payment device verification engine 60(*a*)-3 and the mobile device operating system 60(*a*)-4. The payment profile application 60(*a*)-1 can be a control application which provides instructions to the processor 60(*j*) to run the payment device engine 60(*a*)-3, when the payment device is interfaced with the mobile device 60, to process the input selection of a payment profile in order to read that payment profile 60(*b*)-1 from the memory 60(*b*) and decrypt the profile with a key received from the payment device. The payment profile application 60(*a*)-1 can also include control instructions to write the decrypted payment profile to the output elements 60(*h*), which are coupled to the communication interface 60(*g*) through which the payment device is communicating with the mobile device 60. The output elements 60(*h*) can be utilized to write the payment profiles to the payment device.

Another type of memory 60(*b*) on the mobile device 60 can be separate or divided from the computer readable medium 60(*a*) and preferably stores information such as encrypted payment profiles 60(*b*)-1. Accordingly, memory 60(*b*) can be secure, such as through a known encryption technique, causing the information stored in the memory 60(*b*) to be inaccessible to a user of the mobile device 60, while allowing the applications 60(*a*)-1, 60(*a*)-2, 60(*a*)-3, and operating system 60(*a*)-4 in the CRM 60(*a*) to operate. Any of the aforementioned information stored in the memory or CRM can be transmitted by the mobile device 60.

In some embodiments, information in the payment profiles 60(*b*)-1 can be in the form of data tracks that are traditionally associated with credits cards. Such tracks include Track 1 and Track 2. Track 1 ("International Air Transport Association") stores more information than Track 2, and contains the cardholder's name as well as account number and other discretionary data. Track 1 is sometimes used by the airlines when securing reservations with a credit card. Track 2 ("American Banking Association") is currently and most commonly used. Track 2 is the track that is read by ATMs and credit card checkers. The ABA (American Banking Association) designed the specifications of Track 2 and all world banks abide by those specifications. Track 2 contains the cardholder's account, encrypted PIN, and other discretionary data.

The mobile device 60 can further include one or more communication interfaces 60(*g*), which are typically associated wireless transfer (e.g., data transmission) element, such as an antenna 60(*c*) or optical transmission element, and/or a contact element (not shown). The communication interfaces can be utilized to transmit payment profile information from the output elements 60(*h*) to the payment device during programming. The communication interfaces 60(*g*) function to permit the exchange of data between the mobile device and the payment device.

Communication Interfaces 60(*g*) are capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile device and an interrogation device (e.g., payment device). Thus, the mobile device 60 can be capable of communicating and transferring data via near field communications and receiving data via a cellular network, such as an authorization response message provided by an issuer, or the payment profile received from the issuer.

The mobile device 60 can also include a processor 60(*j*) (e.g., a microprocessor) for processing the functions of the mobile device 60 and a display 60(*e*) to allow a consumer to see application icons, contacts, phone numbers and other information, such as messages. The mobile device 60 can further include input elements 60(*i*) to allow a user to input information (e.g., payment profile selection) into the device, a speaker 60(*f*) to allow the user to hear voice communication (e.g., input instructions), music, etc., and a microphone 60(*d*) to allow the user to transmit his/her voice through the mobile device 60, such as to communication a payment profile selection.

Figure 7:
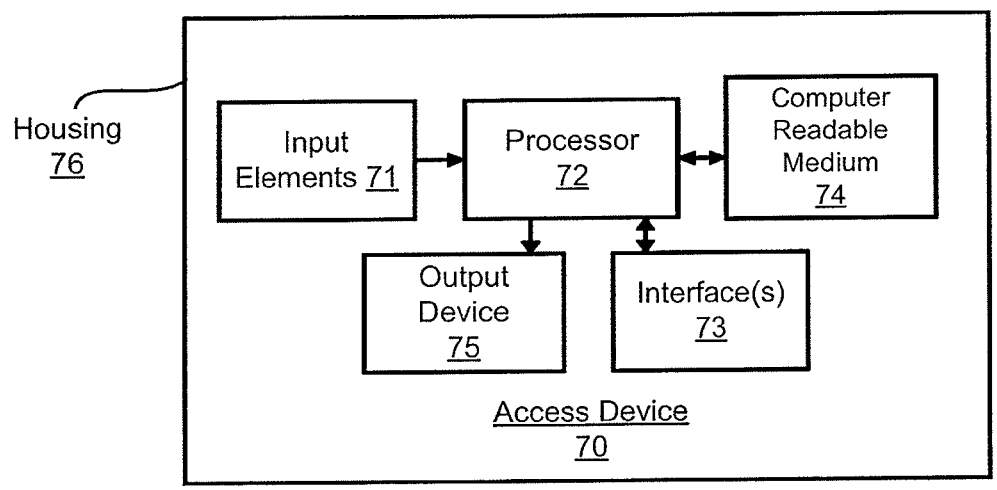
FIG. 7 shows a block diagram of an exemplary access device according to an embodiment.

Referring now to FIG. 7, access device 700, such as a reader is illustrated in one embodiment. The access device 700 can be communicatively coupled to a merchant register to form a point of sale (POS) terminal. The access device 700 can include one or more interfaces 703 (e.g., Universal Serial Bus (USB) connector, wired connection, etc.), one or more input elements 701 (chip card reader, Magstripe reader, barcode scanner, etc.), a housing 706, one or more output elements 705 (display, printer, external storage device), and a computer readable medium (CRM) 704. In one embodiment, the access device is capable of generating a cryptogram each time a consumer device is read for added security. In the case of contactless communication with the consumer device, the input elements 701 can be a transceiver capable of short range, or near field communication (NFC), such as a radio frequency RF transceiver, or an optical scanner. The access device 700 can also be referred to as a card terminal or card reader.

Figure 8:
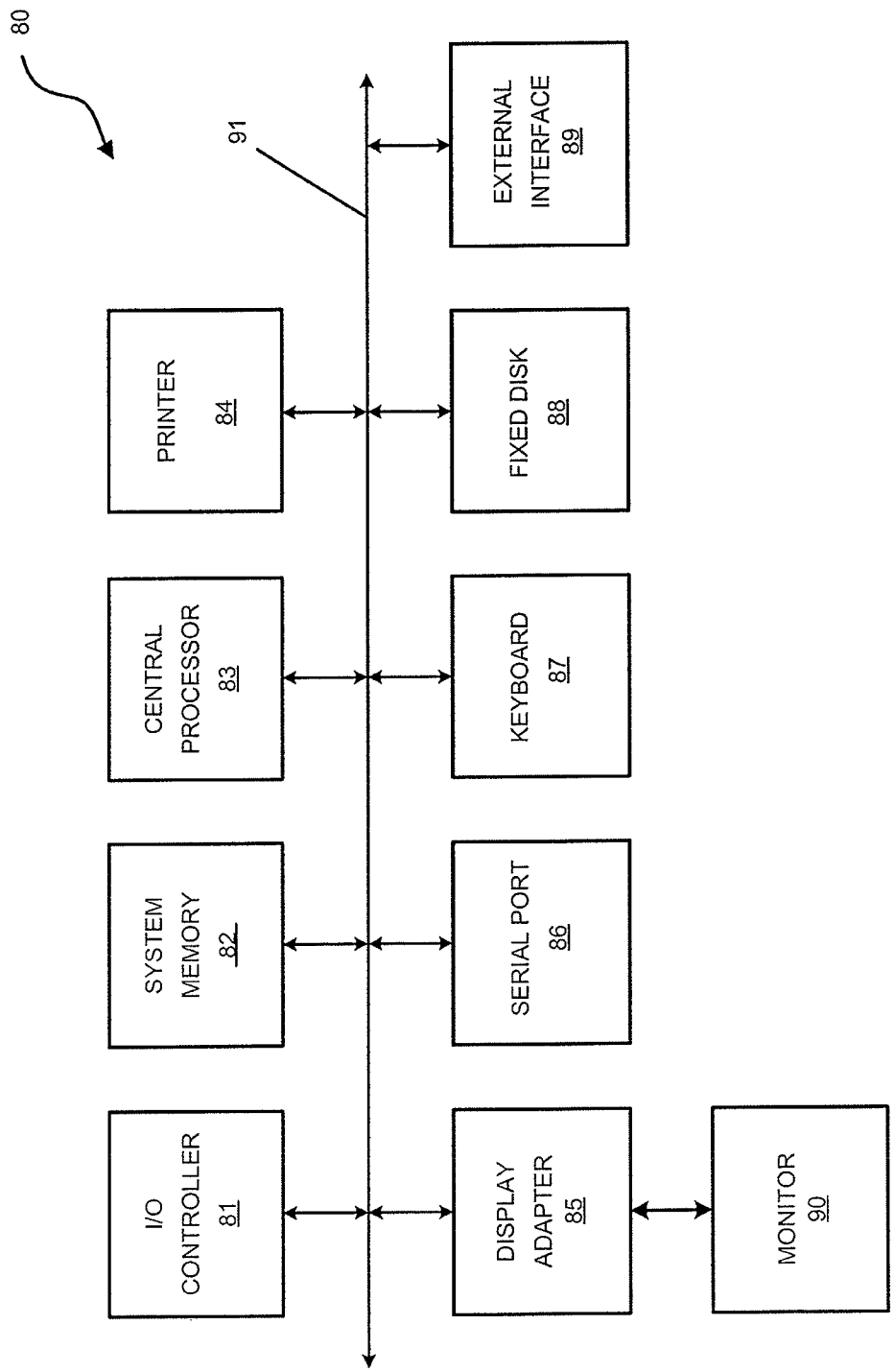
FIG. 8 shows a block diagram of an exemplary computer apparatus according to one embodiment.

Referring now to FIG. 8, the entities in FIG. 3 (e.g., payment processing network 36) can operate one or more computer apparatuses including one or more subsystems. Such subsystems are shown in FIG. 8 and are interconnected via a system bus 91. Additional subsystems such as a printer 84, keyboard 87, fixed disk 88 (or other memory comprising computer readable medium), monitor 90, which is coupled to display adapter 85, and others are shown. Peripherals and input/output (I/O) devices, which couple to I/O controller 81, can be connected to the computer system by any number of means known in the art, such as serial port 86. For example, serial port 86 or external interface 89 can be used to connect the computer apparatus to a wide area network such as the Internet, a mouse input device, or a scanner. The interconnection via system bus allows the central processor 83 to communicate with each subsystem and to control the execution of instructions from system memory 82 or the fixed disk 88, as well as the exchange of information between subsystems. The system memory 82 and/or the fixed disk 88 can embody a computer readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Specific details regarding some of the above-described aspects are provided. The specific details of the specific aspects may be combined in any suitable manner without departing from the spirit and scope of embodiments of the disclosure. For example, the service provider and issuer may be combined in some embodiments of the disclosure. However, other embodiments of the disclosure may be directed to specific embodiments relating to each individual aspects, or specific combinations these individual aspects.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the disclosure.

A recitation of "a", "an" or "the" is intended to mean "one or more" unless specifically indicated to the contrary.

What is claimed is:

1. A method comprising:
   displaying a plurality of payment profile identifiers for a plurality of encrypted payment profiles on a display of a mobile device, wherein an encrypted payment profile in the plurality of encrypted payment profiles includes a payment account, and wherein the payment profile identifier corresponding to the encrypted payment profile in the plurality of encrypted payment profiles includes an identifier of the payment account;
   receiving a selection of the encrypted payment profile in the plurality of encrypted payment profiles through selection of the corresponding displayed payment profile identifier;
   receiving a decryption key from a portable payment device that is coupled to the mobile device;
   decrypting the selected encrypted payment profile using the decryption key received from the portable payment device; and
   writing a decrypted payment profile onto the portable payment device,
   wherein the plurality of encrypted payment profiles are securely stored in a memory element of the mobile device, and
   wherein the plurality of encrypted payment profiles stored in the memory element are not accessible to a user of the mobile device; and
   wherein the method further comprises:
   verifying the portable payment device is associated with the mobile device each time that the portable payment device is interfaced with the mobile device,
   wherein the verifying includes passing a cryptogram stored on the portable payment device to the mobile device.

2. The method of claim 1, wherein the portable payment device includes a plurality of memory structures, including a memory chip and a magnetic stripe.

3. The method of claim 1, wherein the portable payment device operates in the decrypted payment profile.

4. The method of claim 1, wherein the decrypted payment profile stored on the portable payment device decays over a predetermined time period.

5. The method of claim 4, wherein the time period is 2-10 minutes.

6. The method of claim 1, wherein the portable payment device is a payment card.

* * * * *